Nov. 12, 1935.   J. SCHAUB ET AL   2,020,435
APPARATUS FOR REGULATING THE MIXING OF INGREDIENTS
Filed July 9, 1932
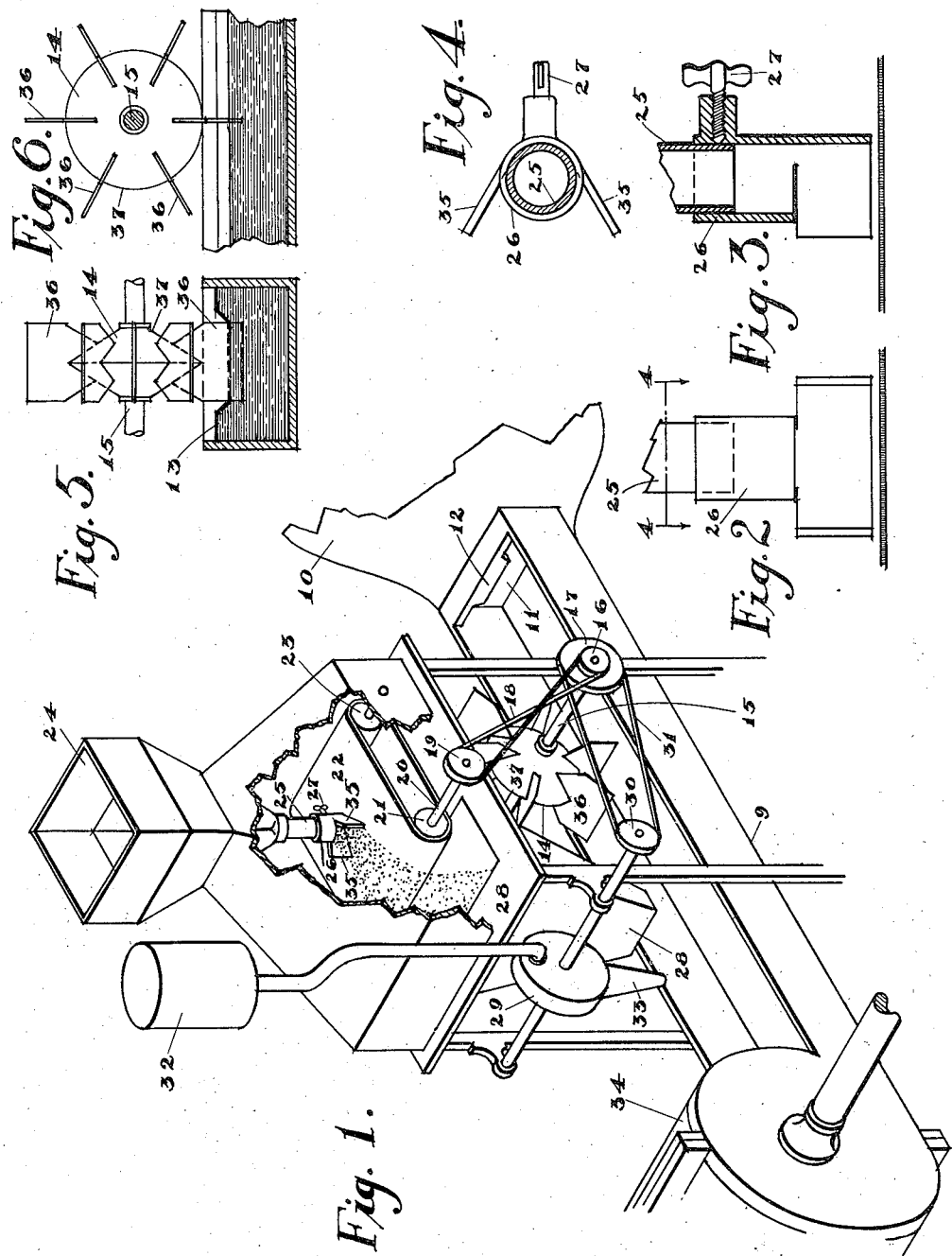
INVENTOR
Jacob Schaub
Gordon Schaub
BY
Paul R. Ames
ATTORNEY Patented Nov. 12, 1935

2,020,435

UNITED STATES PATENT OFFICE 2,020,435

APPARATUS FOR REGULATING THE MIXING OF INGREDIENTS

Jacob Schaub, Westfield, and Gordon C. Schaub, Bayonne, N. J., assignors to The Best Foods, Inc., New York, N. Y., a corporation of Delaware Application July 9, 1932, Serial No. 621,653

13 Claims. (Cl. 259—18)

This invention relates to a machine for regulating the rate of addition of one substance to another and particularly to an apparatus for adding a seasoning material to a food stuff at a regulated rate dependent upon the movement of the material being seasoned.

In describing this invention, reference will be made to the drawing in which Figure 1 is a perspective view illustrating an embodiment of our machine for adding salt and milk in the preparation of butter-like substances. Figure 2 is an enlarged fractional elevation of the device for regulating the quantity of salt delivered. Figure 3 is a vertical section on the center line of Figure 2 and Figure 4 is a section on line 4—4 of Figure 2.

Figures 5 and 6 are side and front elevations, respectively, showing the actuating wheel in contact with the material being seasoned.

This invention is being described with particular reference to its use in connection with the device illustrated in the copending Schaub application Serial No. 621,651 filed July 9, 1932, entitled "Working and compressing apparatus", in which the crystallized emulsion of oil and cultured milk, used in the preparation of butter-like products is worked, compressed and expanded to thoroughly mix and knead the crystals and to remove surplus liquid, after which the mass is delivered to the apparatus described herein. It is not intended, however, to restrict it to that particular use.

In this embodiment of the invention, the mass is extruded into the trough 9 from the compressor or water extractor 10 through the opening 11 and under the template 12, whereby it is formed into a block with a groove adapted to receive the salt and milk to be added by the device to be described herein. This block or print 13 contacts with the blades of the paddle wheel 14 to rotate the same and actuate the shaft 15 carrying the sprockets or pulleys 16 and 17. The pulley 16 is connected, through the chain, belt, or other suitable driving mechanism 18, with the pulley or sprocket 19, which is fixed to the shaft 20, to which the roller 21 is also fixed. A continuous belt 22 extends around the driven roller 21 and the idling roller 23. The upper surface of this belt is advanced from right to left, as viewed in Figure 1, by the clockwise rotation of the wheel 14 resulting from the forward movement through the trough 9 of the material extruded through the opening 11.

The salt or other seasoning material to be added is placed in a hopper 24 having an outlet tube 25. To the lower end of this outlet tube there is attached a sleeve 26 which is adapted to slide upon the tube 25 and which may be fixed at any desired position, by the set screw 27, to deposit a pile of seasoning material of a suitable height upon the upper surface of the endless belt 22. As the seasoning material is advanced by the endless belt 22, it falls into the funnel shaped trough 28 by which it is lead to the groove in the surface of the print extruded from the compressor 10.

If it is also desired to add a liquid such as milk to the material extruded, this may be done through a pump 29 which is actuated by the rotation of the shaft 15 through the pulleys or sprockets 17 and 30 and the chain or belt 31, or other suitable means. In using this device the liquid may be placed in the container 32 and measured quantities of it may be applied to the extruded material through the liquid measuring pump 29, which may be of any well known design, and through the pump outlet 33.

The extruded material with the added salt and liquid may then be conveyed to a worker or kneader 34, such, for example, as that described in the aforementioned copending Schaub application, where it is further mixed and kneaded in order that the added ingredients may be entirely incorporated into and mixed with the extruded mass in the preparation of the finished butter-like substance.

The sleeve 26 is shown as provided with wings 35, 35 adapted to guide the pile of salt. This sleeve may be raised and lowered to permit the discharge of the desired amount of seasoning material upon the belt as the latter is actuated by the wheel 14. The shape and size of this sleeve may, of course, be altered to regulate the size and shape of the pile of seasoning material deposited upon the belt. Also, if preferred, a micrometer such as that used upon microscopes, may be substituted for the set screw 27 to permit extremely accurate control of the height of the sleeve from the belt and the quantity of seasoning material supplied to the substance being seasoned.

The paddle wheel 14 may be constructed, as illustrated more clearly in Figures 5 and 6, with blades 36 fixed to a hub 37 which may be hollow and shaped to give increased strength, or many other types of paddle wheels or actuators may be used for this purpose.

It is appreciated that the invention disclosed herein may be utilized in many different forms and it is not intended to restrict it to the particular embodiment shown or to the particular use with which it has been illustrated. The terms used in describing the invention have been used in their descriptive sense and not as terms of limitation and it is intended that all equivalents thereof be included within the scope of the appended claims.

What we claim is:

1. A device of the type described, comprising means for moving a semi-solid ingredient in a stream, a rotatably mounted paddle wheel having blades normally transverse of and adapted to contact with and cut into the semi-solid moving material to rotate said wheel, an endless conveyor belt operating on pulleys and actuated by the rotation of said wheel, and means for supplying a regulated quantity of material to said endless conveyor, said endless conveyor being positioned so as to discharge the material conveyed by it upon the material actuating the paddle wheel.

2. An apparatus for adding seasoning material to a plastic food product, comprising a template, a conduit, a paddle wheel actuated by the movement of the plastic food product extruded through said template as it advances in said conduit, an endless belt actuated by said paddle wheel, a hopper for a seasoning material, a tube adapted to deliver seasoning material from said hopper to the endless belt, a sleeve adjustable upon said tube to regulate the quantity of seasoning material delivered to said endless belt, and means for guiding said seasoning material from said endless belt to the plastic food product.

3. An apparatus as described in claim 2, including a liquid measuring pump actuated by said paddle wheel to add a liquid to said plastic food product.

4. An apparatus as described in claim 2 in which the paddle wheel comprises a hollow hub in the form of two cones positioned base to base, and radially disposed blades projecting therefrom.

5. A device of the type described, comprising a template having a downward projecting portion adapted to provide a groove in a semi-solid plastic material extruded through it, a paddle wheel having blades adapted to cut into and be rotated by the movement of said plastic material, a conveyor belt actuated by the rotation of said paddle wheel, means for supplying to said belt a regulated quantity of an ingredient to be added to said plastic material and means for guiding the added ingredient from the belt to the groove made in the plastic material by the template.

6. A device as defined in claim 5, including means actuated by said paddle wheel for conveying measured quantities of a liquid substance to said groove.

7. A device of the type described, comprising means for moving a plastic material in a stream, an actuator comprising blade carrying means rotatably mounted and positioned with the blades normally transverse of and dipping into the plastic material, a belt conveyor actuated by the rotation of said actuator to convey another ingredient to be mixed with said plastic material, a container for said other ingredient, a conduit from said container terminating in a tube positioned above said belt and an adjustable sleeve at the end of said tube adapted to regulate the height of the pile of the added ingredient on said belt.

8. A device as defined in claim 7, including means actuated by said paddle wheel for conveying measured quantities of a liquid ingredient to said plastic material.

9. An apparatus of the type described, comprising means for moving a semi-solid ingredient in a stream, an actuator having blades adapted to cut into and be moved by the movement of the semi-solid ingredient, a belt conveyor actuated by said actuator to convey another ingredient to a point of mixing with the semi-solid ingredient and means for supplying a regulated quantity of the said other ingredient to said belt.

10. An apparatus for adding a measured quantity of an ingredient to a moving stream of another ingredient comprising a rotatable member, means for actuating said rotatable member, a movable belt actuated in accordance with the movement of said rotatable member and adapted to convey the ingredient to be added to the other ingredient, a hopper for the ingredient to be added, a tube adapted to deliver to the movable belt the ingredient to be added, and a sleeve having an outlet flared in the direction of movement of said belt, said sleeve being adjustable upon said tube to regulate the quantity of the added ingredient delivered to said belt.

11. An apparatus as defined in claim 10 in which the adjustable sleeve surrounds the lower end of the delivery tube and is provided with means for accurately regulating its height from the said belt.

12. An apparatus of the type described, comprising a template, means for extruding a semi-solid ingredient through said template in a stream, an actuator having blades adapted to cut into and be moved by the movement of the semi-solid ingredient, a conveyor actuated in accordance with the movement of the said blades to convey another ingredient to a point of mixing with the semi-solid ingredient, and means for supplying the other ingredient to the said conveyor.

13. An apparatus of the type described, comprising a template having a portion projecting downwardly from the upper edge thereof, means for extruding a semi-solid plastic mass through the said template to form a groove in the upper surface of the extruded plastic mass, a rotatable member having blades adapted to cut into and be moved by the movement of said extruded plastic mass, a conveyor actuated in accordance with the movement of said blades to convey another ingredient to the said groove in the plastic mass, and means for supplying the said other ingredient to the said conveyor.

JACOB SCHAUB.
GORDON C. SCHAUB.